2,912,390

SYNTHETIC RESIN FROM DIHALOALKYL XYLENE AND POLYALKYLENE POLY-AMINES

John J. Jaruzelski, Pittsburgh, Pa., assignor to Pittsburgh Plate Glass Company, Allegheny County, Pa., a corporation of Pennsylvania No Drawing. Application May 8, 1956
Serial No. 583,360

2 Claims. (Cl. 260—2.1)

This invention relates to polyamine resins and it has particular relation to polyamine resins which have valuable acid absorbing properties.

It has heretofore been recognized that highly versatile halomethyl derivatives of alkylated benzenes, such as xylene, could be prepared by reacting said alkylated benzenes with formaldehyde in the presence of a hydrogen halide, such as hydrochloric acid. Appropriate techniques of preparing such compounds are disclosed in an application of Alfred R. Bader, Serial Number 463,801, filed October 21, 1954, and again in an application of Frank Fekete, Serial Number 557,451, filed January 5, 1956, Patent No. 2,830,078.

It has heretofore been suggested to absorb acids from liquid media by means of certain resins and notably certain anion exchange resins in free base form. In most instances, the resins are of porous character and are also employed in a particulate form such as beads or granules. Obviously, the resins should be insoluble and chemically resistant in the medium. They should also be adapted to be regenerated by treatment with an appropriate alkali.

This invention is based upon the discovery that halomethyl derivatives and notably dihalomethyl derivatives of alkylated benzenes, such as xylene, can readily be reacted with amines and preferably amines containing a substantial series of amino groups interconnected by alkyl chains to form resinous polyamines which apparently are long chain compounds comprising the hydrocarbon portions of the halomethyl alkylated benzenes interconnected by chains comprising alternate alkylene hydrocarbon groups and amino groups. The invention further involves the discovery that the polyamines are porous, insoluble materials having valuable acid absorbing properties and can be regenerated by treatment with base to permit a repetition of the cycle. They are, therefore, adapted for use as acid absorbing media.

In the reaction to form the resins of this invention, various amines of long chain structure may be employed. Usually the chains should contain both primary and secondary amine groups and there should be at least three amino groups in the chain. Such compounds may be prepared, for example, by the reaction of an unsaturated compound, such as ethylene dichloride with ammonia. A typical formula for the amines employed in the reaction may be represented as follows:

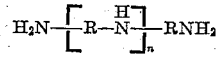

where the group R is an alkylene group and $n$ is a whole number from 1 to 10 or even higher. R may be methylene, ethylene, propylene, butylene, alpha,alpha'xylylene, or the like. Those containing 2 to 4 carbon atoms are representative.

The halomethyl derivatives of alkylated benzenes which may be reacted with the foregoing long chain amines may be represented by the structural formula:

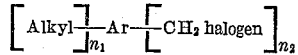

where Ar is a benzene ring; $n_1$ is a whole number from 1 to 3; $n_2$ is a whole number from 2 to 3; Alkyl may be methyl or ethyl; halogen is chlorine, bromine or iodine. Specific examples of compounds of this class comprise dichloromethyl-xylenes of the formula:

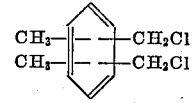

or dichloromethyl mesitylene of the formula:

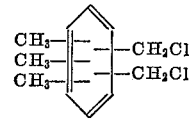

The reaction of the long chain amine compounds and the halomethyl substituted alkylated benzene may be represented by the following equation:

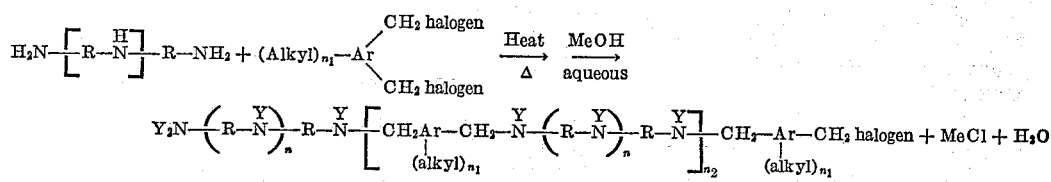
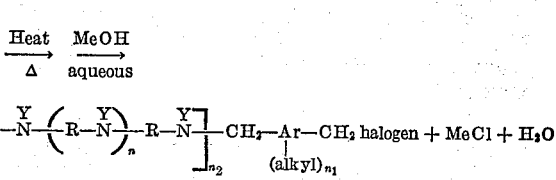

The groups Y may be hydrogen or polymer groups similar to the parenthetical

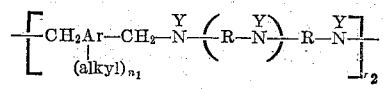

above given, cross-linked at one or more points to the parent molecule. One or more of the groups Y may also be pendent groups. Me is a base such as sodium, potassium or calcium. The terms R, Ar, alkyl, halogen, $n$ and $n_1$ have the significance previously given and $n_2$ is a whole number of a value of at least 1 and increases with the length of the chain. The latter is of sufficient length that the product is insoluble, e.g. 20 or less.

The preparation of halomethyl alkylated benzenes for use in the preparation of the ion exchange resins of this invention may be conducted conveniently by the interaction of an alkylated benzene, such as xylene, with formaldehyde in the presence of a hydrohalide, such as hydrogen chloride. The techniques of such preparation are illustrated by the following example:

*Example I*

In accordance with the provisions of this example, a 1,000 milliliter, three-necked flask equipped with a stirrer, a reflux condenser and a thermometer, is charged with a benzene solution of a reaction mixture comprising:

| | |
|---|---|
| Tetraethylene pentamine | 63 grams (0.33 mole). |
| Dichloromethyl-xylene | 110 grams (0.55 mole). |
| Methanol | 200 milliliters. |
| Celite | 25 grams. |

The benzene constitutes an inert reaction medium. The Celite provides a filler or carrier for the resin material. The foregoing mixture is refluxed for 5½ hours and an additional 20 grams (0.10 mole) of dichloromethyl-xylene are added. Heating is continued for 1½ hours and the mixture is poured into an excess of 7 percent aqueous sodium hydroxide solution. The mixture is heated for approximately 2 hours longer and the solid is filtered off, washed several times, ground and dried for 3 hours at 95° C. The product is obtained in a yield of 274 grams and contains approximately 38 percent of moisture and is of a density of 0.37 gram per milliliter. The product is then soaked and washed with distilled water and dried at room temperature for 24 hours to a moisture content of 59 percent. The dried material amounted to 417 grams. The granular product is of the following analysis:

| | Percent |
|---|---|
| Nitrogen | 4.87 |
| Silica ($SiO_2$) | 5.37 |

This resinous product has anion absorbing properties as is demonstrated by the following tests.

The resin is soaked in an excess of 0.3 normal hydrochloric acid and is filtered from the acid solution. Upon washing the resin with distilled water and titrating the filtrate with sodium hydroxide, it is found that acid is taken up by the resin. The acid absorption capacity of the material as initially obtained with 38 percent of moisture is 1.85 milliequivalents per gram.

The sample of material containing 49 percent of moisture was found to pick up 1.27 milliequivalents of acid per gram. This resin body could be employed as anion exchange resin to remove anions from aqueous solutions.

The resin may be regenerated by treating it with an aqueous alkali, such as sodium hydroxide, in order to remove anions.

*Example II*

In accordance with this example, substitute triethylenetetraamine for the tetraethylene pentamine of Example I and proceed as in the former example.

In the preceding examples, dichloromethyl-mesitylene may be substituted for the dichloromethyl-xylene. In accordance with this procedure, dichloromethyl-mesitylene may be prepared by the reaction of mesitylene with aqueous formaldehyde and hydrochloric acid. The reaction mixture may for instance comprise:

| | |
|---|---|
| Mesitylene | grams 120 |
| Formaldehyde (37 percent aqueous solution) | milliliters 300 |
| Hydrochloric acid (concentrated) | do 300 |
| Zinc chloride (catalyst) | grams 10 |

The foregoing components are charged into a three-necked glass flask which is provided with the appropriate appurtenances, namely a reflux condenser, a thermometer and an inlet for hydrogen chloride gas. The charge is heated to 90° C. while anhydrous hydrogen chloride is introduced. The reaction is continued for 6 hours after which, the reaction mixture is cooled. The solid products are filtered off, washed with water and recrystallized from heptane. The product is a white crystalline material of the structure:

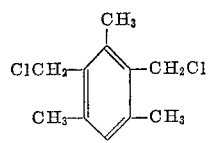

(M.P. 101 to 103° C.)

*Example III*

In accordance with this example, substitute dichloromethyl-mesitylene for the dichloromethyl-xylene in Example I and proceed as in the former example.

The resins of this invention may be alkylated, as for example by treating the resin product of Example I with an alkyl halide, such as methyl iodide. The resultant quaternary salt may be used as an anion exchange resin, or it may be converted into a base by treatment with caustic, such as sodium or potassium hydroxide. The resin may be used to take up strong acids in media, such as water.

The following example illustrates the preparation of one such modified resin:

*Example IV*

The starting resin of this example corresponds to that of Example I. A 100 gram sample of this material is reacted with 180 milliliters of 40 percent aqueous formaldehyde containing 1 percent of sodium hydroxide. The mixture is heated until no more moisture evaporates. An 80 gram quantity of methyl iodide dissolved in 100 milliliters of toluene is then added and the mixture is refluxed for 6 hours. The solid resin is filtered off and is heated for 3 hours in a 30 percent solution of sodium hydroxide. Water is added and the resin is washed 3 times, after which it is dried for 24 hours. The product weighs 65 grams and has a density of 0.51 gram per milliliter.

The resin will absorb 1.49 milliequivalents of HCl per milliliter volume.

The forms of the invention as herein given are to be considered as being by way of example. It will be apparent to those skilled in the art that numerous modifications may be made therein without departure from the spirit of the invention or the scope of the appended claims.

I claim:

1. An ion exchange resin which is the product of reaction of tetraethylene pentamine and dichloromethyl xylene, the tetraethylene pentamine being present in a ratio of about 0.65 mole per 0.33 mole of the dichloromethyl xylene, the reaction being between the amine groups of the tetraethylene pentamine and the chlorine groups of the dichloromethyl xylene.

2. An ion exchange resin which is the product of reaction of (A) a long chain polyamine of the structure

in which R is of a class consisting of methylene, ethylene, propylene, butylene and $n$ is a number from 1 to 10, and (B) a dihalomethyl xylene, the reaction being between the amino groups of the compound (A) and the halogen groups of the compound (B).

References Cited in the file of this patent

UNITED STATES PATENTS

| 2,411,142 | Kelso | Nov. 19, 1946 |
| 2,469,693 | Lundberg | May 10, 1949 |
| 2,546,938 | Bauman et al. | May 27, 1951 |
| 2,588,784 | Whittaker et al. | Mar. 11, 1952 |
| 2,732,352 | Blaricom et al. | Jan. 24, 1956 |

FOREIGN PATENTS

| 517,738 | Great Britain | Feb. 7, 1940 |
| 652,830 | Great Britain | May 2, 1951 |